United States Patent
Muhonen et al.

(10) Patent No.: US 7,899,448 B2
(45) Date of Patent: Mar. 1, 2011

(54) METHOD FOR USE IN A COMMUNICATION SYSTEM

(75) Inventors: Janne Muhonen, Helsinki (FI); Jozsef Molnar, Budapest (HU)

(73) Assignee: Nokia Corporation, Espoo (FI)

( * ) Notice: Subject to any disclaimer, the term of this patent is extended or adjusted under 35 U.S.C. 154(b) by 8 days.

(21) Appl. No.: 10/986,978

(22) Filed: Nov. 15, 2004

(65) Prior Publication Data

US 2006/0019647 A1 Jan. 26, 2006

(30) Foreign Application Priority Data

Jul. 20, 2004 (GB) .................................. 0416227.7

(51) Int. Cl.
 *H04M 3/00* (2006.01)
(52) U.S. Cl. ...................... 455/419; 455/552.1; 455/448; 455/426.1; 455/454
(58) Field of Classification Search ................ 455/552.1, 455/448, 426.1, 454, 432.1
See application file for complete search history.

(56) References Cited

U.S. PATENT DOCUMENTS

| | | | | |
|---|---|---|---|---|
| 6,002,936 A | * | 12/1999 | Roel-Ng et al. | 455/456.4 |
| 6,104,929 A | * | 8/2000 | Josse et al. | 455/445 |
| 2002/0160785 A1 | * | 10/2002 | Ovesjo et al. | 455/453 |
| 2004/0121793 A1 | * | 6/2004 | Weigele et al. | 455/522 |
| 2004/0147242 A1 | | 7/2004 | Pasanen et al. | |
| 2005/0107094 A1 | | 5/2005 | Hulkkonen et al. | |

FOREIGN PATENT DOCUMENTS

WO WO0111911 2/2001

OTHER PUBLICATIONS

3GPP-ETSI TS 123 195 V5.3.0—Global System for Mobile Communications, "Digital cellular telecommunications system (Phase 2+); Universal Mobile Telecommunications System (UMTS); Provision of User Equipment Specific Behaviour Information (UESBI) to network entities", Mar. 2004, pp. 1-30.

Jacques Achard; Technical Specification Group Services and System Aspects; TSGS#23(04)0011; Meeting #23, Phoenix, USA, Mar. 15, 2004, http:/vvww.3gpp.org/ftp/tsg_sa/TSG_SA/TSGS_23/Docs/zip/sp-040011.zip.

Technical Specification Group Services and System Aspects;TSGS#23(04)0034; Meeting #23, Phoenix, USA, Mar. 15, 2004; http:/ww.3gpp.org/ftp/tsg_sa/TSG_SA/TSGS_23/Docs/zip/sp-040034.zip.

* cited by examiner

*Primary Examiner* — Charles N Appiah
*Assistant Examiner* — Kwasi Karikari
(74) *Attorney, Agent, or Firm* — Alston & Bird LLP

(57) ABSTRACT

This invention relates to a method for use in a communications system comprising the steps of determining if user equipment is capable of supporting a first technology and obtaining from said user equipment information about said user equipment only if said user equipment is capable of supporting said first technology.

20 Claims, 3 Drawing Sheets

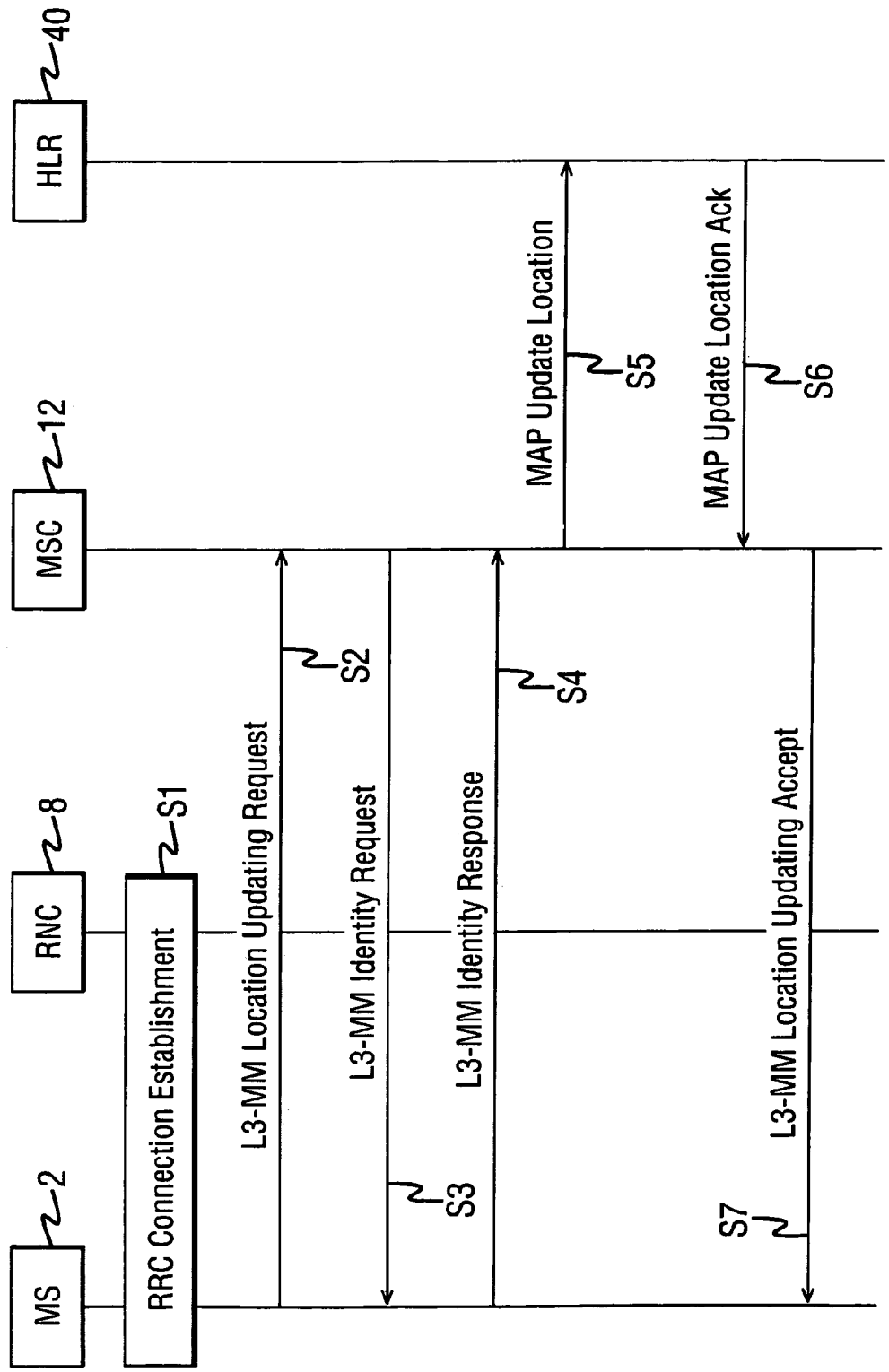

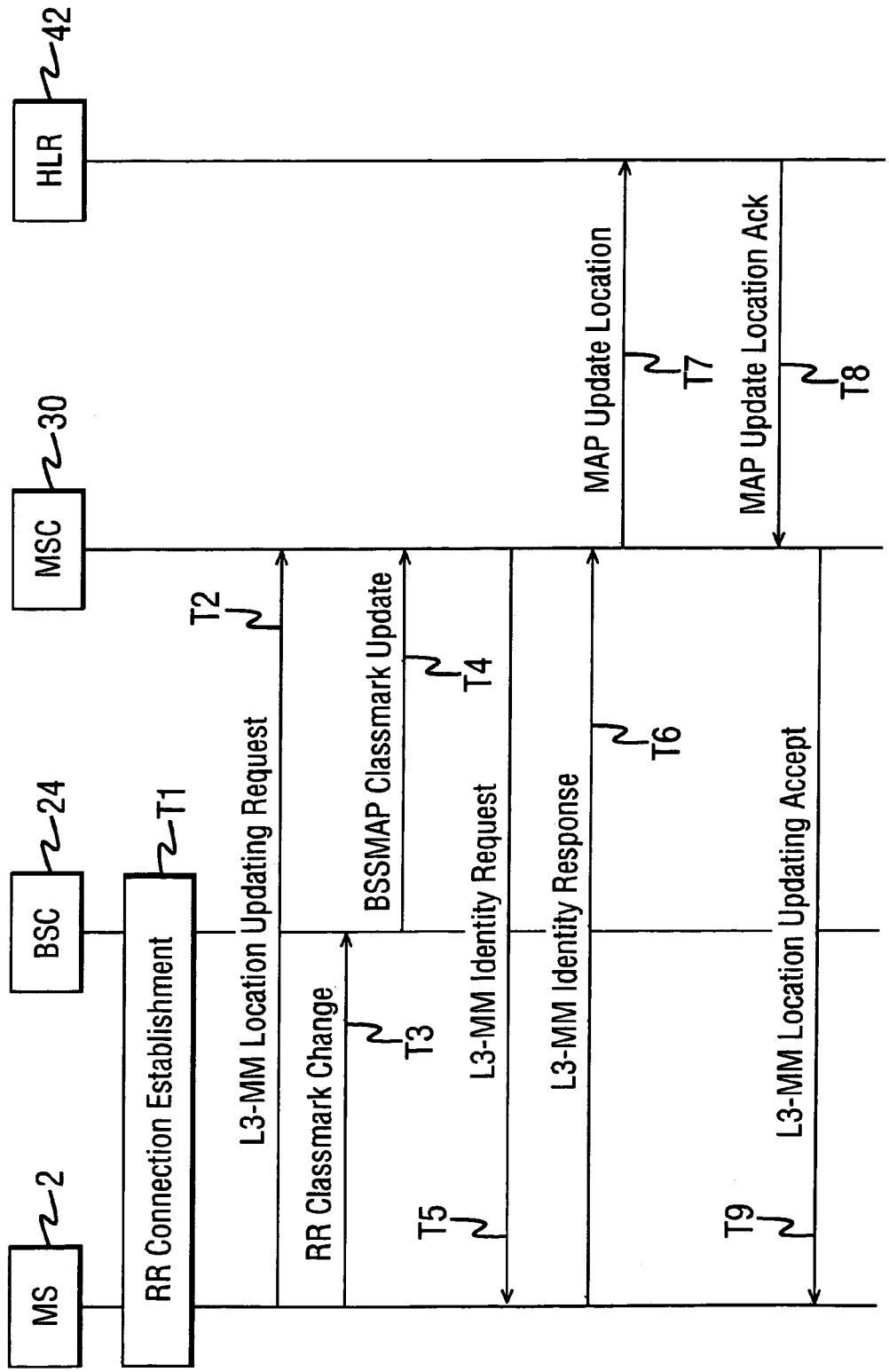

METHOD FOR USE IN A COMMUNICATION SYSTEM

FIELD OF THE INVENTION

The present invention relates to a communication system and method.

BACKGROUND OF THE INVENTION

A cellular telecommunications system is a communication system that is based on the use of radio access entities and/or wireless service areas. The access entities operate over respective coverage areas that are typically referred to as cells. Examples of cellular telecommunications systems include standards such as GSM (Global System for Mobile communications) or various GSM based system (such as GPRS (General Packet Radio Service)), AMPS (American Mobile Phone System), DAMPS (Digital AMPS), WCDMA (Wideband Code Division Multiple Access), UMTS (Universal Mobile Telecommunications System), CDMA 2000 and so on.

In a cellular system, a base transceiver station provides a wireless communication facility that serves mobile stations (MS) or similar wireless user equipment (UE) via an air or radio interface within the coverage area of the cell.

GSM is a so called second generation system which is widely used. UMTS is a so called third generation system and it is envisaged that in the future UMTS may replace GSM. However, at the moment GSM and UMTS systems co-exist. Some user equipment, but not all, is able to communicate both with UMTS systems and GSM systems.

The third generation partnership project (3GPP) has been setting out aspects of the UMTS system. It has standardised a mechanism to cope with the fact that some user equipment which have previously been provided may contain some faulty behaviour. A so called bit map architecture option has been selected as the mechanism for achieving this.

In this regard, reference is made to the 3GPP standard TS 23.195 (version 5.3.0) which specifies the functionality for this feature. The core network is arranged to delivery user equipment specific behaviour information (UESBI) over the Iu interface to the RNC (radio network controller) which can then adapt its functionality with respect to the malfunctioning user equipment. The UESBI-Iu is derived from the user equipment's international mobile equipment identity with software version (IMEISV) which is requested from the user equipment using a specific MM (mobility management) procedure at location updating. In particular, the used MM procedure is the MM identity request.

With the currently proposed standard, the MSC/MSS (mobile switching centre/MSC server) needs to retrieve the IMEISV from the user equipment when the location update is done over the Iu- or the A-interface. The A-interface is between MSC/MSS and BSC (GSM/2G architecture At the moment UESBI-Iu is utilized only by UTRAN according to 3GPP TS 23.195, i.e. when the UE has a connection over the Iu-interface. However, retrieval of IMEISV over the A-interface too is required due to possible inter-system handover from GSM to UMTS during a call. This is valid when a call is established in GSM radio access, and when inter-system handover to UMTS occurs, then the MSC controlling the call should have the IMEISV of the UE.

However, the mechanism currently proposed has a problem. According to TS 23.195, the IMEISV needs to be obtained from the user equipment in every circuit switched IMSI (international mobile subscriber identity) Attach and Inter-VLR (visitor location register) Normal Location Updating procedure. The MM identity request procedure needs to be performed, as discussed above, when the IMSI Attach and Normal Location Updating mode takes place over the A interface and for examples occurs in a MSC/MSS which is serving only a GSM BSS (base station system). On the other hand, the UESBI-Iu can only be sent over Iu interface and is thus usable only for UMTS purposes only.

At the moment the number of user equipment that are able to provide GSM access only as compared to the number of user equipment that are capable of providing UTMS access is very large. It is envisaged that this situation is likely to continue for a number of years. Thus, the currently proposed procedure involves the MM identity request procedure being performed unnecessarily, because for a UE capable of GSM radio access only the inter-system handover is not possible. This is undesirable.

Accordingly, it is an aim of embodiments of the present invention to address this problem.

SUMMARY OF THE INVENTION

According to a first aspect of the present invention there is provided method for use in a communications system comprising the steps of determining if user equipment is capable of supporting a first technology and obtaining from said user equipment information about said user equipment only if said user equipment is capable of supporting said first technology.

According to a second aspect of the present invention there is provided a communications system comprising an entity arranged to determine if user equipment is capable of supporting a first technology and user equipment, said entity being arranged to only request information about said user equipment if said user equipment is capable of supporting said first technology.

According to a third aspect of the present invention there is provided an entity for use in a communications system, said entity being arranged to determine if user equipment is capable of supporting a first technology and to obtain from said user equipment information about said user equipment only if said user equipment is capable of supporting said first technology.

BRIEF DESCRIPTION OF DRAWINGS

For a better understanding of the present invention and as to how the same may be carried into effect, reference will now be made by way of example only to the accompanying drawings in which:

FIG. 2a schematically shows a signal flow used in embodiments of the present invention For IMSI attach procedure in UMTS; and FIG. 2b schematically shows a signal flow used in embodiments of the present invention For IMSI attach procedure in GSM.

DETAILED DESCRIPTION OF PREFERRED EMBODIMENTS OF THE INVENTION

Figure 1:
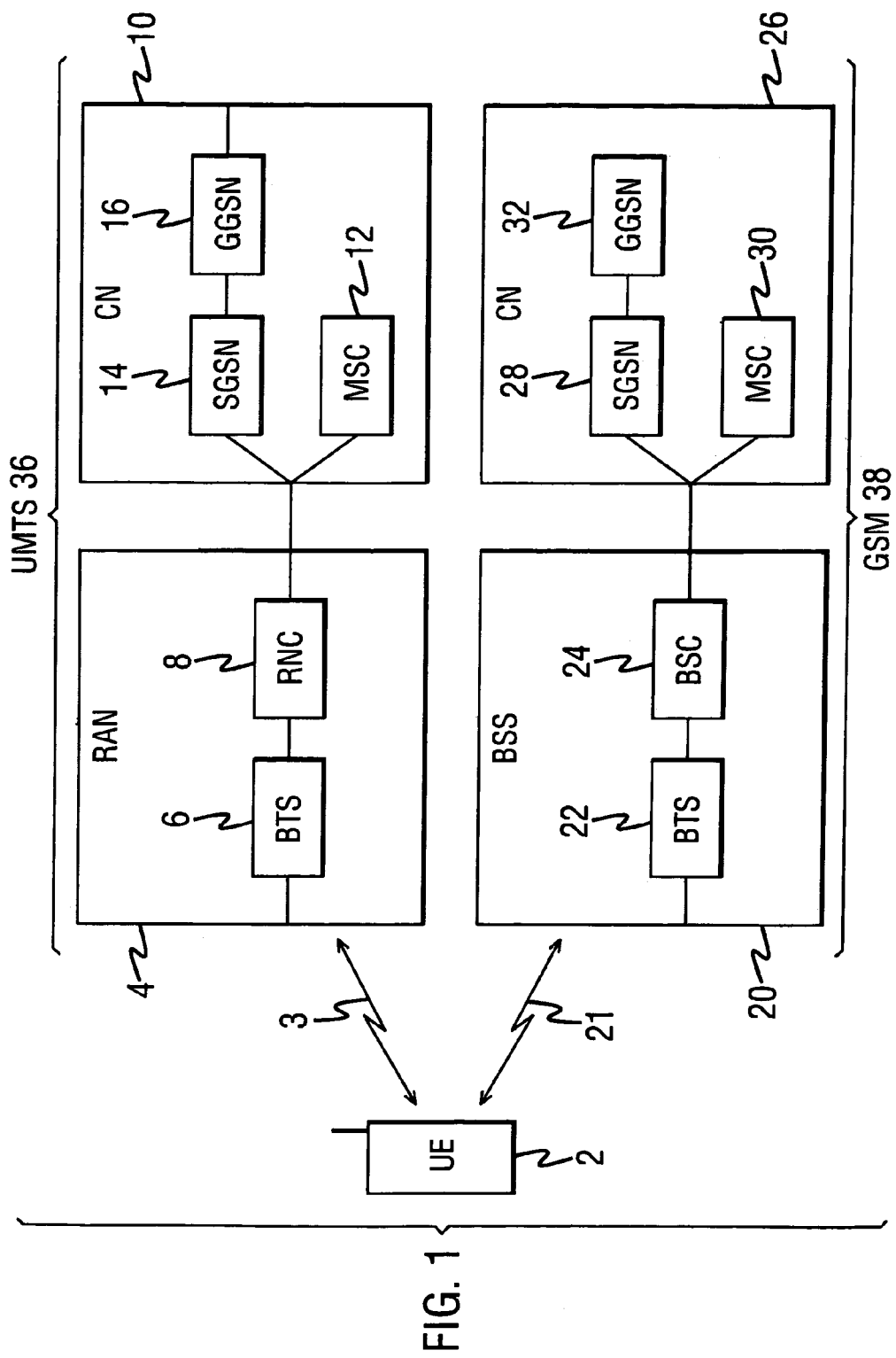
FIG. 1 shows schematically an arrangement in which embodiments of the present invention can be incorporated.

FIG. 1 shows schematically a system in which embodiments of the present invention can be incorporated. User equipment UE 2 is provided. The user equipment can take any suitable form and may for example be a mobile telephone, mobile station, portable computer, personal digital assistant or any other suitable entity. In the arrangement shown in FIG.

1, a UTMS system 36 is shown along with a GSM system 38. The user equipment 2 may be able to communicate only with the GSM system 38 or to communicate with the GSM system 38 and the UMTS system 36.

The UMTS system 36 will first be described.

If the user equipment 2 is able to communicate with the UMTS system then this will be via a radio interface 3. In particular, the user equipment 2 is arranged to communicate via the interface 3 with a radio access network 4. The radio access network 4 comprises a base transceiver station 6. In practice, the radio access network 4 will comprise a number of base transceiver stations 6, although only one of which is shown for clarity. Each base transceiver station 6 is controlled by a radio network controller RNC 8. Again, a number of RNCs will be provided although only one is shown for clarity. Additionally, each RNC 8 will be responsible for controlling a number of base transceiver stations. The RNC 8 which is responsible for controlling the BTS 6 to which the user equipment 2 is attached is referred to as the serving RNC.

The radio access network 4 is connected to a core network 10. The core network 10 illustrated in FIG. 1 has a circuit switched path which consists of a MSC 12. In FIG. 1 the MSC includes the VLR functional entity, which however could be also a standalone network entity according to 3GPP specifications. The MSC may comprise of a separate MSC server and media gateway when control and user plane traffic is separated.

The packet switched pathway comprises a serving GPRS support node SGSN 14 which is connected to a gateway GPRS support node 16. The SGSN 14 provides a similar function to the MSC 12 whilst the GGSN 16 provides a similar function to the gateway 18. Preferred embodiments of the present invention are implemented in the circuit switched CS domain. However additionally or alternatively embodiments of the invention can also be implemented in the packet switched PS domain.

As mentioned, FIG. 1 also shows a GSM network. The user equipment 2 is connected via a radio interface 21 to a base station subsystem BSS 20 which is similar to the RAN of the UMTS system. In a similar way to the radio access network of the UMTS network, the BSS 20 of the GSM system 20 comprises base transceiver station 22 and base station controller 24. In practice, more than one base station and base station controller are provided but are omitted for clarity. The base station controller 24 is equivalent in functionality to the RNC 8 of the UMTS network.

The GSM network 38 also comprises a core network 26 similar to the core network 10 of the UMTS network 36. The core network 26 has an SGSN 28 and GGSN 32 for packet switched communication and a MSC 30 for circuit switched communication. It is possible that same physical core network nodes (MSC) service both GSM and UMTS radio networks.

As mentioned, the user equipment 2 may be able to communicate with only a GSM network 38 or a GSM network 38 and a UMTS network 36. The user equipment 2 may start with one network and move to the other. If this happens during a call, then there will be handover between the respective SGSN or MSC of the networks depending on the nature of the call.

In embodiments of the present invention, the required MM signalling and in particular the MM identity request procedure is minimised so that the IMEISV is only obtained for the user equipment that is capable of UTRAN (UMTS terrestrial radio access network) access. In other words, the IMEISV is only obtained for those mobile stations that are capable of UMTS access. This MM identity request procedure does not take place for those user equipment that is only capable of GSM access.

The third generation partnership project 3GPP specifications include classmarks as does the GSM specification. These mobile station classmarks provide information about the capability of the mobile station or user equipment.

There are three types of classmark currently defined—Classmark 1, Classmark 2 and Classmark 3.

Mobile station Classmark 1 and Classmark 2 information both have a two predefined bits which provide the following information. Where the bits are 00, this indicates that the mobile station is a GSM phase 1 mobile station. Where the bits are 01, this indicates that the mobile station is a GSM phase 2 mobile stations. In practice, 00 and 01 will indicate that the user equipment is only capable of GSM communication and not UMTS communication.

Where the bits are 10, this indicates that the mobile station supports 3GPP release 99 of a UMTS specification or later versions of the protocol. This therefore indicates that the user equipment may be capable of UMTS communication. If the bits have the values 11, this indicates that they are reserved for future use. It should be noted that 3GPP release 99 compliant UE might have only GSM radio. MS Classmark 3 provides thorough information on radio access capabilities.

In embodiments of the present invention, if the values are 00 or 01, it is assumed that the mobile station is not capable of UMTS network. Accordingly, the IMEISV will not be obtained because the user equipment is not capable of handing over to the UMTS system and therefore there is no use for the UESBI-Iu. The MSC of the UMTS network only obtains the IMEISV with the MM identity request procedure for those user equipment having a revision level set to 10 or possibly 11.

MS classmarks are generally CS domain information elements, and in PS domain there is corresponding IEs (information elements)—MS Radio Access Capability and MS Network Capability (defined in TS 24.008). MS Radio Access Capability corresponds to MS CM3, and MS Network Capability to MS CM2.

It should be appreciated that there is also classmark 3 information. The following MS CM3 fields are relevant:
  UMTS FDD Radio Access Technology Capability
  UMTS 3.84 Mcps TDD Radio Access Technology Capability
  UMTS 1.28 Mcps TDD Radio Access Technology Capability It should be appreciated that embodiments of the invention may use information introduced into the classmarks at a later date or new classmarks or the like.

Reference is made to FIG. 2a which schematically shows the signalling involved when a user equipment first attaches to a UMTS network.

In step S1, the user equipment 2 establishes a RRC (Radio Resource Control) connection. This is defined in more details in the 3GPP technical specification 25.331. This RRC connection is established between the user equipment 2 and the RNC 8.

In step S2, the user equipment sends to the MSC 12 a L3(Layer 3)-MM Location Updating Request. This is specified in more detail in the 3GPP technical specification 24.008. In this request, the Location Updating Type information element indicates IMSI attach as a type of updating. This message will include classmark 1 information elements. In the Iu-Interface MM Location Updating Request message is encapsulated within the RANAP (radio access network application protocol) Initial UE Message, which is the first message after establishment of the Iu-Interface signalling connection. Thus, this will indicate to the MSC whether or not the user equipment 2 may be able to make a UMTS connection. This determination is done in the MSC 12.

If it is determined that the user equipment 2 may be capable of a UMTS connection, the next step will be step S3. This is a layer 3 L3-MM identity request sent from the MSC 12 to the user equipment and requests from the user equipment the IMEISV.

In step S4, the user equipment 2 sends a L3-MM identity response to the MSC 12 which includes the IMEISV.

In step S5, the MSC performs a location update and in particular sends a MAP (Mobile Application Part) Update Location message to the HLR 40.

In step S6, the HLR provides an acknowledgement to the MSC 12 of the Update Location message. This procedure is defined in more detail in the 3GPP technical specification 29.002.

In step S7' the MSC accepts the IMSI attached procedure by sending a Location Updating Accept message to the user equipment 2.

Reference is now made to FIG. 2b which shows the IMSI Attach procedure in GSM.

In step T1, the user equipment 2 establishes a Radio Resource RR connection with the base station controller 24. This is defined in more detail in the 3GPP technical specification 44.018.

In step T2, the user equipment 2 sends an L3-MM Location Updating Request to the MSC as defined in more detail in the 3GPP technical specification 24.008. This message is as discussed in relation to step S2 of FIG. 2a. In the A interface, MM Location Updating Request message is encapsulated within the BSSMAP Complete L3 Information message which is the first message after establishment of the A-Interface Signalling connection.

In step T3, the user equipment 2 sends to the base station controller 24 an update of the MS class mark information, as for example defined in the 3GPP technical specification 44.018. This message includes MS class mark 2 information and may for example include MS class mark 3 information.

In step T4, the BSC 24 forwards the received classmark information to the MSC 30. This is defined for example in the 3GPP technical specification 48.008.

The next step is step T5 is similar to step S3 of FIG. 2a and results in the requesting of the IMEISV by the MSC from the user equipment 2.

Step T6 corresponds to step S4 and results in the UE 2 providing the IMEISV to the MSC 30.

Steps T7, T8 and T9 correspond to steps S5, S6 and S7 of FIG. 2a and will not be described in further detail.

If it is determined, between steps T2 and T5, from the classmark information that the user equipment is not capable of supporting UTMS then the IMEISV is not requested.

Consider the case where user equipment is handed over from a GSM system to a UMTS system. As shown in the scenario illustrated in FIG. 2b, the IMEISV is attained if the user equipment is or might be capable of UMTS radio access (or supporting 3GPP release 99 or latest version according to the revision level of the classmark information considered). This is enabled to allow potential intersystem handover to a UMTS system later on. Thus, the IMSI Attach is via the GSM radio access. The call is established in the GSM radio access and during the call intersystem handover to UMTS, the IMEIV already obtained is needed by the MSC of the UMTS system in order to map it to the UESBI-Iu which must be sent within handover signalling messages to the target RNC. With current proposals before intersystem handover to the UMTS, the user equipment will not perform IMSI Attach or Location Update to UMTS. This is why in embodiments of the present invention the IMEISV needs to be obtained in the IMSI Attach of Location Update in the GSM radio access.

It should be appreciated that the UESBI-Iu is derived by the MSC of the GSM network from the IMEISV. The UESBI-Iu is sent by the GSM MSC to the UMTS MSC in a message such as for example (prepare handover request). The MSC includes the UESBI-Iu in the IU-Relocation request which it sends to the target RNC.

Embodiments of the present invention have been described in the context of the currently proposed specifications. However, it should be appreciated that embodiments of the present invention can have broader application. For example, the IMEISV may not be attained in the GSM attach procedure. This may require the handover procedure to be modified in order to obtain that information.

Reference has also been made to various of the specifications with regard to the messaging. It should be appreciated that embodiments of the present application have wider application and can be applied to scenarios which are modified with respect to those specifications.

It should be appreciated that the modifications to the signalling proposed by the described embodiments of the present invention will take place in the UMTS network.

Thus, in embodiments of the present invention, when the user equipment sends a location up dating request to the MSC then if the location up dating type is set to IMSI Attach, the MSC will obtain the IMEISV from the user equipment is able to or potentially capable to support UMTS radio access technology.

If only MS Classmark 1 or MS Classmark 2 is available then retrieval of IMEISV is omitted for a UE supporting only GSM radio access. Additionally if the MS Classmark 3 is available, then the MSC can further verify for 3GPP release 99 or newer UEs whether it supports UMTS radio access or not. If MS Classmark 3 is not directly available, then the core network may not request the MS Classmark 3 with separate signalling procedures either.

If the location updating type is set to Normal Location Updating then the MSC shall obtain the IMEISV from the user equipment if it supports UMTS radio access technology.

Thus, the MSC is arranged to obtain the IMEISV if the MS was not previously registered in the visitor location register. Optimisation of the MSC behaviour for the latter case is permitted in order to balance the signalling load caused by obtaining the IMEISV at every intra-MSC normal location update against the chances that the MSC does not discover the IMEISV changes caused by the SIM being inserted into a new user equipment which then location updates to a new LA within the same MSC.

Where the mobile is not registered in the MSC, the MSC shall request the IMEISV from the user equipment, provided it supports UMTS radio access technology or is 3GPP release 99 or newer, using the MM identification procedure. Once the IMEISV has been obtained, the MSC shall send the UESBI-Iu information to the SRNC on the Iu interface as specified in TS 23.195.

Where embodiments of the invention are applied to the PS domain, GPRS Attach, Combined GPRS and IMSI attach and Routing Area Update are examples of the relevant procedures.

Embodiments of the invention can be provided in conjunction with automatic device detection. Automatic device configuration ADC allows the network to automatically detect, configure and/or provision the user's terminal at power-on. Automatic device detection ADD is part of ADC and is the functionality of the core network to automatically detect new and changed combinations of mobile terminal and SIM. This detection can trigger a number of services in the operator's service network, one of them being to send configuration parameters to the UE. In detail ADD allows the HLR to be updated with the IMEISV and enables the network to configure the UE based on a predefined profile.

The invention claimed is:

1. A method, comprising:
   determining if user equipment is capable of supporting a first technology, said determining comprising examining classmark information received from said user equipment; and
   obtaining from said user equipment an indicator comprising a user equipment identity and a software version indicator only if said user equipment is capable of supporting said first technology.

2. The method as claimed in claim 1, wherein said determining further comprises determining if said user equipment is capable of supporting said first technology comprising a wireless access technology.

3. The method as claimed in claim 1, wherein said determining further comprises determining if said user equipment is capable of supporting said first technology comprising at least one of universal mobile telecommunications system technology, release 99 of a third generation partnership project specification, and a version of the third generation partnership project specification specification.

4. The method as claimed in claim 1, wherein said determining further comprises examining said information comprising said classmark information, wherein said classmark information is received in at least one of a mobile management location updating request and a classmark information message.

5. The method as claimed in claim 1, wherein said determining further comprises examining said information comprising information indicating if said user equipment only supports a second technology.

6. The method as claimed in claim 5, wherein said determining further comprises examining said information if said user equipment only supports said second technology comprising global system for mobile communications.

7. The method as claimed in claim 1, wherein said obtaining is carried out in response to a location updating request message sent by said user equipment.

8. The method as claimed in claim 7, wherein said obtaining is carried out if a Location updating type is set to at least one of international mobile subscriber identity attach, normal location updating, general packet radio service attach, combined general packet radio service and international mobile subscriber identity attach, and routing area update.

9. The method as claimed in claim 1, wherein said obtaining further comprises using a mobile management identity request procedure.

10. The method as claimed in claim 1, wherein said obtaining further comprises requesting said information about said user equipment from said user equipment.

11. A system, comprising:
    an entity configured to determine if user equipment is capable of supporting a first technology, wherein said determination comprises examining classmark information received from said user equipment,
    wherein said entity is configured to request an indicator comprising a user equipment identity and a software version indicator from said user equipment only if said user equipment is capable of supporting said first technology.

12. A system as claimed in claim 11, wherein said entity further comprises at least one of a mobile switching center and a serving general packet radio service support node.

13. An apparatus, comprising:
    a determiner configured to determine if user equipment is capable of supporting a first technology, and further configured to examine classmark information received from said user equipment; and
    an obtainer configured to obtain from said user equipment an indicator comprising a user equipment identity and a software version indicator only if said user equipment is capable of supporting said first technology.

14. A system, comprising:
    determining means for determining if user equipment is capable of supporting a first technology, said determining means comprising examining means for examining classmark information received from said user equipment; and
    obtaining means for obtaining from said user equipment an indicator comprising a user equipment identity and a software version indicator only if said user equipment is capable of supporting said first technology.

15. An apparatus, comprising:
    a receiver processor configured to process information from a user equipment, said information comprising classmark information;
    a determiner configured to use said classmark information to determine if said user equipment is capable of supporting a first technology; and
    a requester configured to request an indicator comprising a user equipment identity and a software version indicator from said user equipment only if said user equipment is capable of supporting said first technology.

16. An apparatus, comprising:
    receiving processing means for receiving processing information from a user equipment, said information comprising classmark information;
    a determining means for using said classmark information to determine if said user equipment is capable of supporting a first technology; and
    requesting means for requesting an indicator comprising a user equipment identity and a software version indicator from said user equipment only if said user equipment is capable of supporting said first technology.

17. A method, comprising:
    determining if user equipment is capable of supporting a first technology, said determining comprising examining classmark information received from said user equipment; and
    obtaining from said user equipment an indicator comprising a user equipment identity and a software version indicator only if said user equipment is capable of supporting said first technology,
    wherein said determining further comprises examining said information comprising said classmark information, wherein said classmark information is received in at least one of a mobile management location updating request and a classmark information message.

18. The apparatus as claimed in claim 15, wherein said first technology comprises a wireless access technology and said determiner is configured to use said classmark information to determine if said user equipment is capable of supporting said wireless access technology.

19. The apparatus as claimed in claim 15, wherein said classmark information is received in at least one of a mobile management location updating request or a classmark information message.

20. An apparatus comprising a processor configured to cause the apparatus to at least:
  process information received from a user equipment, said information comprising classmark information;
  use said classmark information to determine if said user equipment is capable of supporting a first technology; and
  cause request of an indicator comprising a user equipment identity and a software version indicator from said user equipment only in an instance in which it is determined that said user equipment is capable of supporting said first technology.

* * * * *